United States Patent
Reddy et al.

(10) Patent No.: US 6,208,097 B1
(45) Date of Patent: Mar. 27, 2001

(54) TRACTION VEHICLE ADHESION CONTROL SYSTEM WITHOUT GROUND SPEED MEASUREMENT

(75) Inventors: Suresh Baddam Reddy, Erie; Jeffrey Louis Diagle, North East; Bret Dwayne Worden, Union City, all of PA (US); Harry Kirk Mathews, Jr., Clifton Park, NY (US); Edgar Thomas Balch, Erie, PA (US); Allan John Connolly, Albany, NY (US); Ajith K. Kumar, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/455,431

(22) Filed: Dec. 6, 1999

(51) Int. Cl.$^7$ ............................................. H02P 15/08
(52) U.S. Cl. ..................... 318/52; 180/197; 701/70; 701/71; 701/74; 701/80
(58) Field of Search ............................ 318/52; 180/197; 701/70, 71, 72, 80, 74

(56) References Cited

U.S. PATENT DOCUMENTS

| | | | |
|---|---|---|---|
| 4,075,538 | * | 2/1978 | Plunkett .................................... 318/52 |
| 4,134,048 | * | 1/1979 | Schneider ................................... 318/52 |
| 4,641,069 | * | 2/1987 | Fujioka et al. ........................... 318/625 |
| 4,701,682 | * | 10/1987 | Hirotsu et al. ............................ 318/52 |
| 4,799,161 | * | 1/1989 | Hirotsu et al. ...................... 364/426.01 |
| 4,896,090 | * | 1/1990 | Balch et al. .............................. 318/52 |
| 5,032,771 | * | 7/1991 | Kerkman et al. ........................ 318/52 |
| 5,251,137 | * | 10/1993 | Chin et al. ......................... 365/426.02 |
| 5,436,538 | * | 7/1995 | Garvey et al. ............................ 318/52 |
| 5,610,819 | * | 3/1997 | Mann et al. ....................... 364/426.05 |
| 5,612,879 | * | 3/1997 | Makino ............................. 364/426.01 |
| 5,708,334 | * | 1/1998 | Schreibber et al. .................... 318/432 |
| 5,841,254 | | 11/1998 | Balch et al. ............................ 318/430 |
| 5,847,534 | * | 12/1998 | Tanamachi et al. .................... 318/201 |
| 6,125,319 | * | 9/2000 | Hac et al. ................................ 701/80 |

\* cited by examiner

Primary Examiner—Robert E. Nappi
Assistant Examiner—Rita Leykin
(74) Attorney, Agent, or Firm—Donald S. Ingraham; Douglas E. Stoner

(57) ABSTRACT

An adhesion control system for a locomotive is provided for achieving and maintaining a maximum adhesion value. The adhesion control system includes a means for determining from an appropriate adhesion-creep curve an ideal creep rate that must be achieved and maintained in order to achieve and maintain a maximum adhesion value, a means for estimating an actual creep rate through the measurement or estimation of motor or wheel acceleration and locomotive acceleration, a means for selecting a creep rate set point based on a comparison of the actual creep rate and the ideal creep rate where the creep rate set point is set to a positive value if the actual creep rate is less than the ideal creep rate minus an acceptable differential and is set to a negative value if the actual creep rate is greater than the ideal creep rate plus the acceptable differential, and a means responsive to the creep rate set point for adjusting the operation of the locomotive so that the maximum adhesion value may be realized where the actual creep rate is increased if the creep rate set point is set to the positive value and is decreased if the creep rate set point is set to the negative value.

19 Claims, 4 Drawing Sheets

TRACTION VEHICLE ADHESION CONTROL SYSTEM WITHOUT GROUND SPEED MEASUREMENT

BACKGROUND OF THE INVENTION

The present invention relates to control systems for electric motor powered traction vehicles such as locomotives, transit vehicles or off-highway vehicles and, more particularly, the invention relates to a method for controlling such a vehicle in a manner to correct for wheel slip or slide during propulsion and electrical retarding, respectively.

Locomotives and transit vehicles as well as other large traction vehicles are commonly powered by electric traction motors coupled in driving relationship to one or more axles of the vehicle. Locomotives and transit vehicles generally have at least four axle-wheel sets per vehicle with each axle-wheel set being connected via suitable gearing to the shaft of a separate electric motor commonly referred to as a traction motor. In the motoring mode of operation, the traction motors are supplied with electric current from a controllable source of electric power (e.g., an engine-driven traction alternator) and apply torque to the vehicle wheels which exert tangential force or tractive effort on the surface on which the vehicle is traveling (e.g., the parallel steel rails of a railroad track), thereby propelling the vehicle in a desired direction along the right of way. Alternatively, in an electrical braking mode of operation, the motors serve as axle-driven electrical generators. Torque is applied to their shafts by their respectively associated axle-wheel sets which then exert braking effort on the surface, thereby retarding or slowing the vehicle's progress. In either case, good adhesion between each wheel and the surface is required for efficient operation of the vehicle.

Maximum tractive or braking effort is obtained if each powered wheel of the vehicle is rotating at such an angular velocity that its actual peripheral speed is slightly higher (motoring) or slightly lower (braking) than the true vehicle speed (i.e., the linear speed at which the vehicle is traveling, usually referred to as "ground speed" or "track speed"). The difference between wheel speed and track (or "ground") speed is referred to as "slip speed" or "creep" There is a relatively low limit value of slip speed at which peak tractive or braking effort is realized. This value, commonly known as optimum is a variable that depends on track speed and rail conditions. So long as the optimum creep is not exceeded, the vehicle will operate in a stable microslip or creep mode. If wheel-to-rail adhesion tends to be reduced or lost, some or all of the vehicle wheels may slip excessively, i.e., the actual slip speed or creep may be greater than the optimum creep. Such a wheel slip condition, which is characterized in the motoring mode by one or more spinning axle-wheel sets and in the braking mode by one or more sliding or skidding axle-wheel sets, can cause accelerated wheel wear, rail damage, high mechanical stresses in the drive components of the propulsion system, and an undesirable decrease of tractive (or braking) effort.

Many different systems are disclosed in the prior art for automatically detecting and recovering from undesirable wheel slip conditions. Typically, differential speeds between axle-wheel sets or rate of change of wheel speed or a combination of these two measurements are used to detect wheel slip. Speed is monitored and if found to exceed predetermined differentials or rates of change, power to the motors is reduced in an attempt to bring speed to a value at which traction is regained. One particular system uses a creep rate control in conjunction with creep measurement to reduce motor torque when exceeds a value that is indicative of wheel runaway. For calculations of creep and creep rate, measurements or estimates of motor/wheel speed and locomotive/vehicle speed are used. Other prior art involves use of wheel slip detectors through measurement/estimate of wheel speed, but they operate within and around creep measurement and control architecture.

The main feature of many locomotive adhesion control systems is the regulation of creep speed to a creep set point, with the creep set point manipulated using an optimizer to achieve peak operation. There are many difficulties associated with determining the creep set point for peak adhesion. Creep regulation requires measurement of creep, which normally involves motor or wheel speed and locomotive speed measurements or estimations. This often results in expensive radar measurement systems or the requirement of an idling axle for locomotive/vehicle speed. In addition, errors in measurement and/or estimation of locomotive speed will result in erroneous creep estimates, making it difficult to determine and operate at the optimal creep set point for maximizing adhesion.

SUMMARY OF THE INVENTION

An apparatus and method for creep rate regulation, for an electric motor traction vehicle is provided that includes (1) creep rate measurement or estimation; (2) creep rate set point determination; (3) creep rate regulation. The output of the creep rate regulator is a torque command that in turn is fed to a torque regulator, or alternatively is a slip frequency command for control of AC induction motor.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
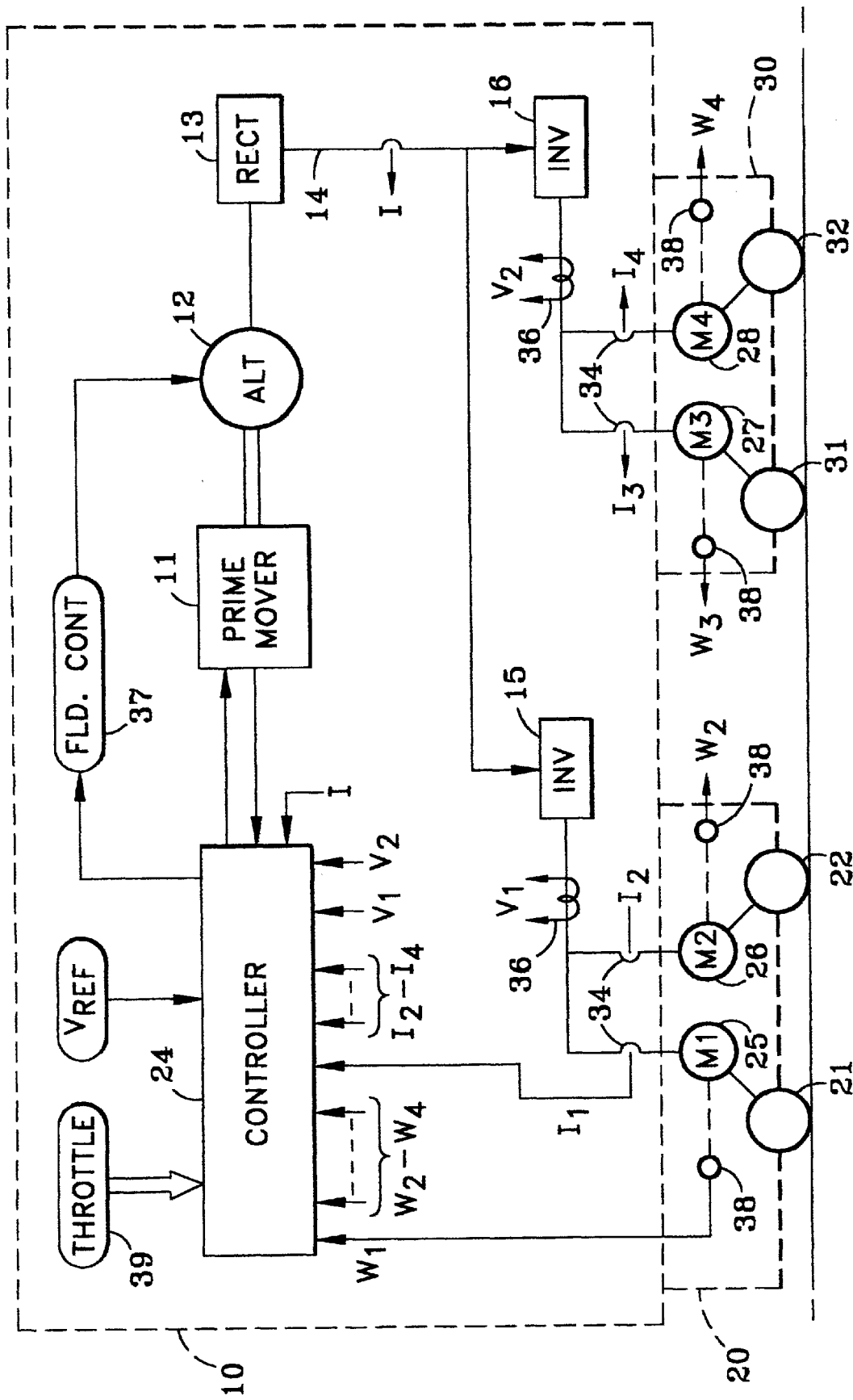
FIG. 1 is a simplified block diagram of a locomotive system with which the present invention may be used.

The creep rate control system of the present invention comprises features for setting creep rate set point and eliminating the need or use of locomotive (or other traction vehicle) speed measurement or estimation.

The creep rate is estimated from motor or wheel speed measurement or estimation and locomotive acceleration measurement or estimation. The actual locomotive speed does not need to be measured.

The creep rate set point is chosen in such a way to enable operation near the peak of the adhesion-creep curve. If the operation is on the left side of the curve peak, a positive creep rate set point is chosen such that creep moves to the right, and hence closer to the peak. If the operation is on the right side, a negative creep rate set point is chosen such that the creep moves to the left, and hence closer to the peak. However, it is not necessary to directly estimate the side of the adhesion-creep curve. If the creep rate exceeds a positive threshold value (an indication of wheel runaway, or backside operation), the creep rate set point could be set to a negative value; if it falls below a negative threshold value (an indication of wheel deceleration or front side operation), the creep rate set point could be set to a positive value. These thresholds are chosen such that the system has adequate stability, with little or no limit cycling behavior. The optimal values for these thresholds depend on the specific dynamics of the electrical and mechanical system, and the rail conditions. These values may be defined as a function of gross motor torque or achieved axle tractive effort, since the achieved tractive effort reflects the nature of rail conditions.

Although there is no need to directly estimate the side of the adhesion-creep curve an estimate of the side of the adhesion-creep curve can be incorporated into the control regime of the present invention. One way to estimate the side of the adhesion-creep curve without need for creep information as follows: The slope of the adhesion creep curve is the same as the rate of change of adhesion (with respect to time) divided by the rate of change of creep. This is expressed in mathematical terms, as:

$$\frac{du}{dc} = \frac{\dot{\mu}}{\dot{c}},$$

where $\mu$ is adhesion, and c is creep. The slope is positive of both and have the same sign; is negative if they have opposite signs.

Adhesion is tractive effort, divided by normal force, or weight.

$$\mu = \frac{TE}{N}$$

where TE is the tractive effort and N is the normal force.

Tractive effort is calculated from motor torque, as follows:

$$TE \approx k\tau - I\dot{\omega}$$

where I is the motor-wheelset effective inertia, $\tau$ is the motor torque, $\omega$ is the motor peed, k is a constant representing gear transmission and wheel radius.

From the above equations, it can be seen that the sign of $\dot{\mu}$ can be estimated from the sign of $$\frac{d(TE)}{dt}.$$

Creep rate itself, and accordingly its sign, is determined from motor acceleration (estimated from speed) and locomotive acceleration. Together, they provide the information about the side of adhesion-creep curve. Once the side or slope sign of the adhesion-creep curve is determined, the creep set point is adjusted as a function of the slope sign. If the sign is positive, the creep rate set point is set to a positive value; if the sign is negative, the creep rate set point is set to a negative value. These positive and negative creep set points are designed to ensure stability. They may be adjusted as functions of system tractive effort levels.

This system allows the actual creep rate to be estimated without the need to measure or estimate locomotive speed.

In addition, a feedback loop is provided that allows the system to quickly adjust the operation of the locomotive to achieve and maintain an ideal creep rate. Maintenance of the ideal creep rate ensures that the locomotive realizes maximum adhesion, as predicted by the appropriate adhesion-creep curve.

In many cases, the locomotive accelerations may be negligible compared to the wheel accelerations, during wheel slip activity. In such cases, locomotive acceleration can be ignored in calculation of creep rate, and the need for locomotive acceleration can be ignored in calculation of creep rate, and the need for locomotive acceleration measurement or estimation is eliminated as well.

The present invention is desirably utilized in various types of alternating current (AC) induction motor and DC motor powered vehicles such as, for example, off-highway vehicles (earth moving machines), transit cars, and railroad locomotives. Such vehicles desirably employ independent axle control, for the invention to be most effective. By way of example and not limitation, the invention is described herein as it may be applied to a locomotive. FIG. 1 presents a simplified block diagram of an exemplary locomotive system with which the invention may be used. A propulsion system 10 of FIG. 1 includes a variable speed prime mover 11 mechanically coupled to a rotor of a dynamo electric machine 12 comprising a 3-phase alternating current (AC), synchronous generator or alternator. The 3-phase voltages developed by alternator 12 are applied to AC input terminals of a conventional power rectifier bridge 13. The direct current (DC) output of bridge 13 is coupled via a DC link 14 to a number of controlled inverters 15 and 16 which invert the DC power to AC power at a selectable variable frequency. The inverters 15 and 16 are conventional inverters employing high power gate turn-off devices (GTO's) which switch in and out of conduction in response to gating signals from a system controller 24 so as to invert the DC voltage on DC link 14 to controlled frequency AC voltage. The AC power is electrically coupled in energizing relationship to each of a plurality of adjustable speed AC traction motors 25–28. Prime mover 11, alternator 12, rectifier bridge 13, and inverters 15 and 16 are mounted on a platform of the traction vehicle 10, illustrated as a 4-axle diesel-electric locomotive. The platform is in turn supported on two trucks 20 and 30, the first truck 20 having two axle-wheel sets 21 and 22 and the second truck 30 having two axle-wheel sets 31 and 32.

Each of the traction motors 25–28 is hung on a separate axle and its rotor is mechanically coupled, via conventional gearing, in driving relationship to the associated axle-wheel set. In the illustrative embodiment, the two motors 25 and 26 are electrically coupled in parallel with one another and receive power from inverter 15 while motors 27 and 28 are coupled to inverter 16. However, in some instances, it may be desirable to provide an inverter for each motor or to couple additional motors to a single inverter. The invention is not limited to such 4-axle systems and is equally applicable to 6-axle locomotives with six inverters each connected for powering a respective one of six traction motors each connected to respective ones of the six axles. Suitable current transducers 34 and voltage transducers 36 are used to provide a family of current and voltage feedback signals which are respectively representative of the magnitudes of current and voltage in the motor stators. Speed sensors 38 are used to provide speed signals representative of the rotational speeds W1–W4 in revolutions per minute (RPM) of the motor shafts. These speed signals are readily converted to wheel speed in a well-known manner. For simplicity, only single lines have been indicated for power flow although it will be apparent that motors 25–28 are typically three phase motors so that each power line represents three lines in such applications.

The magnitude of output voltage and current applied to rectifier bridge 13 is determined by the magnitude of excitation current supplied to the field windings of alternator 12 by field controller 37 which may be a conventional phase controlled rectifier circuit since the alternator field requires DC excitation. The excitation current is set in response to an operator demand (throttle 39) for vehicle speed by controller 24 which is in turn responsive to actual speed as represented by signals W1–W4. Controller 24 converts the throttle command to a corresponding torque request for use in controlling motors 25–28. Since AC motor torque is proportional to rotor current and air gap flux, these quantities may be monitored; or, more commonly, other quantities, such as applied voltage, stator current and motor RPM, may be used to reconstruct motor torque in controller 24. See, for example, U.S. Pat. No. 4,243,927.

In an electrical braking or retarding mode of operation, inertia of the moving vehicle is converted into electrical energy by utilizing the traction motors as generators. Motor voltage and current are controlled to set a desired braking effort.

Figure 2:
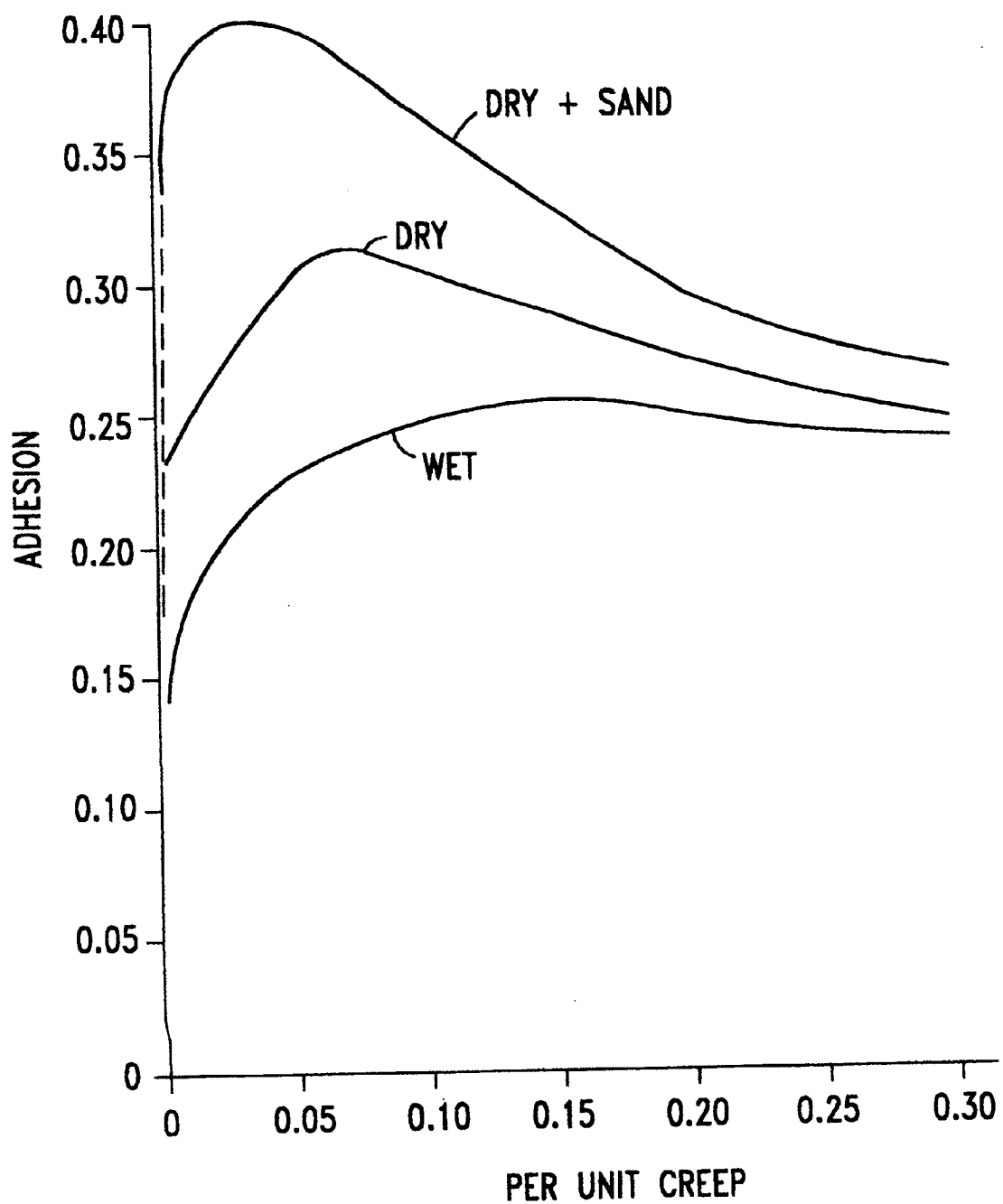
FIG. 2 is a graph of an adhesion curve as a function of creep rate.

Before turning to a description of the detailed implementation of the present invention, reference is first made to the adhesion-creep curves in FIG. 2 which illustrate some examples of wheel to rail slipping or sliding for three different weather conditions common to locomotive applications. The three different weather conditions that were chosen for illustrative purposes are "dry," "dry with sand," and "wet." The vertical axis of the adhesion-creep curves represents adhesion (or friction) and the horizontal axis represents per unit creep. It will be noted that the highest adhesion is available with a rail which is both dry and sanded. As shown by the illustrated curve, the adhesion reaches a peak on the "dry and sanded" adhesion-creep curve at about a 0.05 per unit creep level and then gradually reduces as creep speed increases. Referring to the "dry" adhesion-creep curve, maximum adhesion is obtained at some value of per unit creep less than 0.1, while the "wet" adhesion-creep curve indicates that maximum adhesion is not realized until per unit creep obtains a value somewhere between 0.15 and 0.25.

In general, it is desirable to maintain per unit creep or creep speed at the point at which maximum adhesion occurs. It is thus possible to select the appropriate adhesion-creep curve based on observed weather conditions, and determine from this curve an ideal creep rate that must be achieved and maintained in order to achieve and maintain a maximum adhesion value.

As discussed above, the controller 24 controls power to the motors in a manner to regulate torque or tractive effort developed by the locomotive. In doing so, the controller desirably operates the motors so as to establish operation at an ideal creep speed for maximizing traction. An exemplary controller for accomplishing this function is disclosed in U.S. Pat. No. 5,841,254. The present invention eliminates the need for actual speed measurement or estimation.

Figure 3:
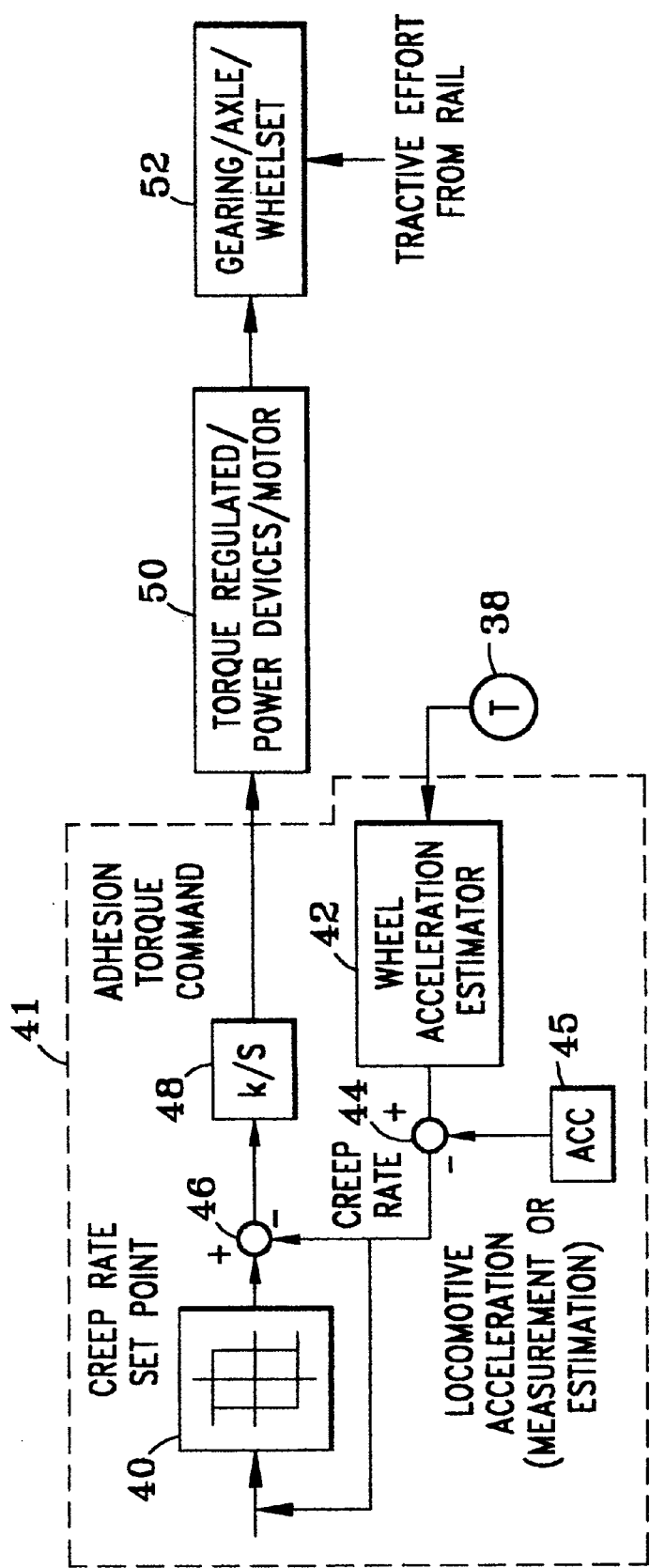
FIG. 3 is a functional block diagram of an adhesion control system incorporating aspects of the present invention.

FIG. 3 is a functional block diagram of one implementation of a creep control system (also referred to as an adhesion control system) 41 (outlined in phantom in FIG. 3) which does not require direct ground speed measurement. The components described below are electrically coupled together to provide signals as set forth below. A creep rate set point module 40 is configured to set a creep rate set point with hysteresis in response to a creep rate signal. The threshold values and set points for the hysterisis are designed using closed loop system simulations, to provide system stability under different conditions. One set of constant values may be adequate, but they typically are chosen as functions of torque levels. The torque levels provide an indication of rail conditions (higher torques for dry conditions, compared to wet or snow conditions etc.), and the threshold values chosen as appropriate function of torque levels provide additional stability margins over wider operating conditions. As used herein, "module configured to" and the like is used to refer to a function performed by the controller; it may include, but is not necessarily, a physically separate unit, alternatively the functions may be performed by a programmable computer, application specific integrated circuit (ASIC) or other computing means. Wheel acceleration estimator 42 estimates wheel acceleration, i.e., change in wheel speed, from speed feedback, e.g., from tachometers 38 of FIG. 1. The output of estimator 42 is wheel acceleration which is combined as indicated by a creep rate signal module 44 (typically comprising a summing junction or the like) with a signal representative of locomotive acceleration. Locomotive acceleration may be obtained by direct measurement using a conventional accelerometer 45 or estimated. The locomotive acceleration can be estimated from the acceleration of the non-slipping axle motors, or processing of accelerations of all the motors. It can also be estimated from locomotive tractive efforts, a model of the train inertia and track grade. Train inertia may be estimated from operation of the train under non-wheel slip conditions, while the grade is either estimated adaptively or with a barometric pressure measurement, available on the locomotive. The result of the summation is a creep rate value which is then summed with the creep rate set point developed by creep rate set point module 40 as indicated in FIG. 3 at creep rate error module 46. The difference between the creep rate set point value and the actual creep rate is coupled to an integrator 48, the output of which then becomes the torque command signal. The torque command signal is then applied to a torque regulator 50 which typically includes the torque regulation circuit, the power devices and the electric motors illustrated in FIG. 1. The motor drives the wheel axle sets of the locomotive through appropriate gearing as indicated by block 52.

The block diagram of FIG. 3 represents the input provided by adhesion control system 41 to the torque regulator. When the torque command requested based on engine notch setting and speed is generated by the adhesion controller, the adhesion torque command is bypassed in favor of the main torque command. In other words, the adhesion torque command is only utilized as a limit function to assure that the creep rate set point is not exceeded. The creep rate set point (block 40) typically is chosen based on the estimated creep rate. If creep rate is positive and above a, the creep rate set point is set to a negative value and maintained at that value until the creep rate becomes negative and falls below a threshold. Once the creep rate falls below the negative threshold, the creep rate set point is set to a positive value and the process repeated. In the embodiment of FIG. 3, the creep rate is obtained from motor or wheel acceleration and locomotive acceleration. Motor or wheel acceleration typically is estimated from motor speed measurement obtained from tachometers 38. The hysteresis curve shown in the block 40 specifies the creep rate set point based on creep. If creep rate is too high, the creep rate set point is set to a negative value. If creep rate is too low, the creep rate set point is set to a positive value. The error between creep rate set point and creep rate is computed in the summing junction 46 and the integral controller 48 acts on the creep rate error to provide the torque command for the motor as part of the adhesion control system.

The thresholds for creep rate used in determining the creep set point provide a means to indirectly estimate the side of the adhesion-creep curve. The side of the adhesion-creep curve can also be directly estimated, which eliminates the need for the thresholds, but adds additional complexity to the controller. This feature is described below.

Specifically, the torque rate and the average creep rate of the locomotive can be estimated, or alternatively, measured, and these values then used to calculate the rate of change of tractive effort (this rate of change is the difference between the torque rate and inertia multiplied by the average creep rate). The sign of the rate of change of tractive effort and the sign of the average creep rate can then be used in conjunction to ascertain whether the locomotive is operating to the left or to the right of the peak of the appropriate adhesion-creep, such as, for example, the curves shown in FIG. 2. Once the side of the adhesion-creep curve is determined, the creep rate set point is selected as follows. If the locomotive is operating to the left of the peak of the appropriate adhesion-creep curve, this condition indicates that the actual creep rate is less than the ideal creep rate. The creep rate set point is then set to a specific positive value, indicating to the system that the actual creep rate needs to be increased. On the other hand, if the locomotive is operating to the right of the peak of the appropriate adhesion-creep curve, this indicates that the actual creep rate is greater than the ideal creep rate. The creep rate set point is then set to a negative value, indicating to the system that the actual creep rate needs to be decreased.

Regardless of how a set point is chosen, the creep rate control system 41 acts to ensure that the locomotive operates within a certain acceptable range around the peak of the appropriate adhesion-creep curve by biasing the creep rate set point in a direction contrary to the actual behavior and thus forcing the system to fluctuate slightly around the peak of the adhesion-creep curve.

The signal from the creep rate regulator typically is a torque command that in turn is fed to a torque regulator, or it may be a slip frequency command that is able to control the AC induction motor. Referring specifically to FIG. 3, the error between the creep rate set point and the actual creep rate is computed in the creep rate error module 46, and integration 48 acts on the computed error to provide the torque command for the motor.

Figure 4:
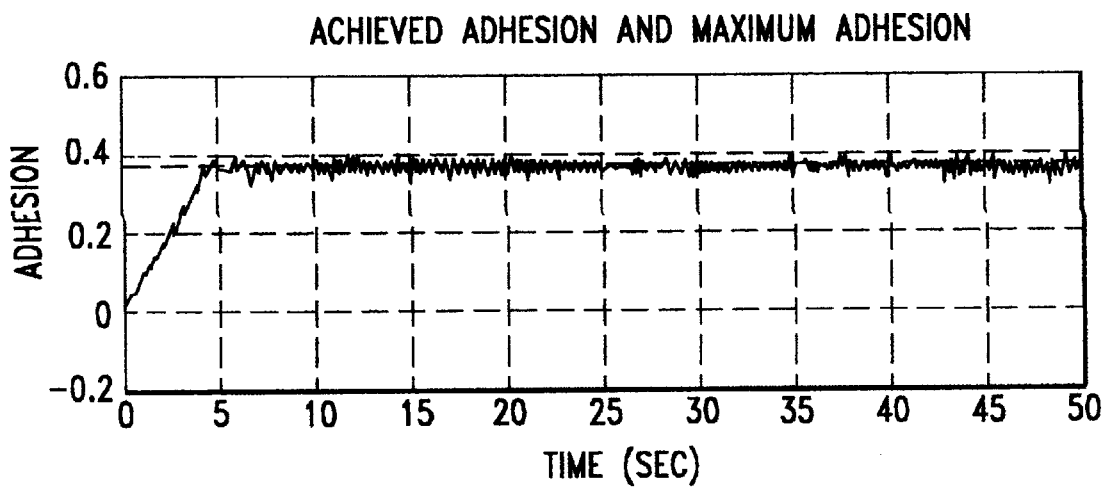
FIG. 4 is a graph illustrating how the adhesion value is regulated for a locomotive with the adhesion control system of FIG. 3.
Figure 5:
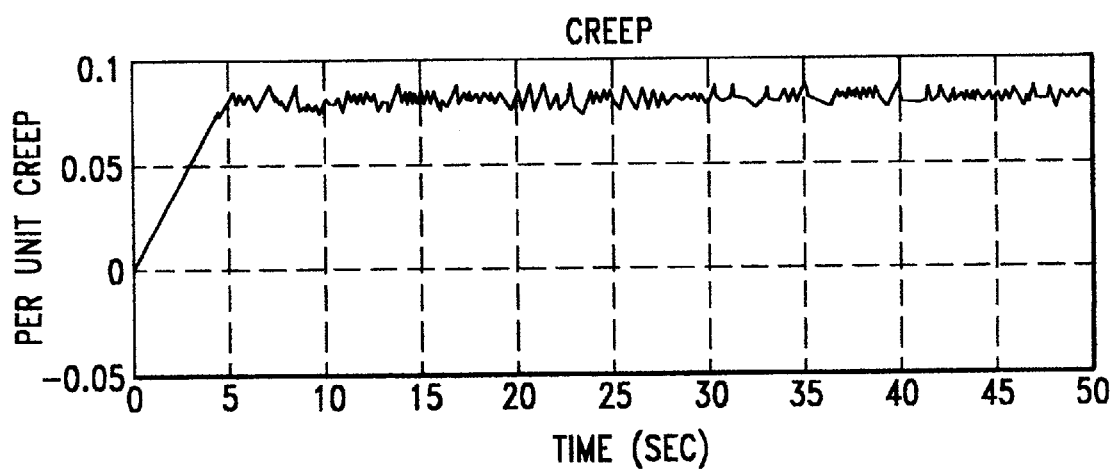
FIG. 5 is a graph illustrating how the creep rate is regulated using the system of FIG. 3.

FIGS. 4 and 5 illustrate how the adhesion and the actual creep rate characteristics vary over time for a locomotive with the adhesion control system of the present invention. FIG. 4 plots adhesion as a function of time and FIG. 5 plots per unit creep over the same time function. As evidenced by these graphs, the adhesion control system quickly adjusts the operation of the locomotive so that the operation stabilizes around the optimum creep and the maximum adhesion value. The oscillations around the optimal creep and the maximum adhesion value emphasize the adjustments that are made as the actual creep rate falls below specific threshold and then rises above another specific threshold. As the actual creep rate falls outside the threshold limits, the control system reacts to force the actual creep rate to move in the opposite direction. This small limit cycling behavior is induced by the hysteresis in the control system that is shown in FIG. 3, and ensures operation near the peak of the appropriate adhesion-creep curve. The parameters of the hysteresis and the controller gains can be tuned to reduce the magnitude of these oscillations.

These results are consistent with the appropriate adhesion-creep curve, which predicts that if the ideal creep rate is achieved and maintained, the operation of the locomotive will achieve and maintain maximum adhesion.

The adhesion control system of the present invention is adaptable to work even for cases where the appropriate adhesion-creep curve has no negative slope characteristic. This is so because changes in the slope of the adhesion-creep curve from a high positive value to a shallow or small positive value results in larger dynamic creep rates, which enable the controller to switch from a positive creep set point to a negative creep rate set point. This switching helps stabilize the controller without resulting in excessive creep rates. An additional protection feature against excessive slip can be added based on the speeds of all axles/motors. Excessive wheel slip can be detected if the differential between the motor/wheel speed and the minimum speed of all axles surpasses a maximum value. If this differential exceeds a maximum value, a controller (e.g., a PI) acting on the difference can be used to generate an alternative torque command signal. This torque command signal, if lower than that of the creep rate controller, will bypass the command from the creep rate controller and will be sent to the torque regulator.

Although the invention has been described above, it should be understood that the same is intended by way of illustration and example only and is not to be taken by way of limitation. Accordingly, the spirit and scope of the invention are to be limited only by the terms of the appended claims.

What is claimed is:

1. A method for adhesion control in a traction vehicle having a creep rate regulating system comprising:

determining from a selected adhesion-creep curve a desired creep rate set point that must be achieved and maintained in order to achieve and maintain a maximum adhesion value;

estimating an actual creep rate from wheel acceleration and vehicle acceleration;

generating a creep rate error signal based on a comparison of the actual creep rate and the desired creep rate set point; and creating a torque command in correspondence with the creep rate error for adjusting the operation of the traction vehicle to minimize said creep rate error.

2. The method of claim 1 further comprising the step of estimating wheel acceleration from a vehicle speed sensor.

3. The method of claim 2 wherein said vehicle speed sensor is selected from the group consisting of wheel speed sensors, axle speed sensors, and motion speed sensors.

4. The method of claim 2 wherein vehicle acceleration is measured with an accelerometer.

5. The method of claim 1 wherein the step of creating a torque command further comprises the step of acting to bias the creep rate set point in a direction to cause the creep rate regulating system to operate said vehicle so as to fluctuate around the peak of the adhesion-creep curve.

6. A creep rate regulator for an electric motor powered vehicle having a plurality of electric motors each coupled in driving relationship to respective wheels of the vehicle, the regulator comprising:

means for obtaining a first signal representative of wheel acceleration;

means for obtaining a second signal representative of vehicle acceleration;

means for deriving from said first and second signals a third signal representative of wheel creep rate;

means for comparing said wheel creep rate signal to a signal representative of a desired creep rate to obtain a creep rate error;

means for converting said creep rate error to a torque command for controlling the electric motors in a manner to minimize said creep rate error.

7. The regulator of claim 6 wherein said means for obtaining said first signal comprises a tachometer coupled to wheel, axle or motor for obtaining a wheel speed signal and means for deriving an estimate of wheel acceleration from variations in said speed signal.

8. The regulator of claim 6 said means for obtaining said second signal comprises an accelerometer.

9. The regulator of claim 7 wherein said means for obtaining said second signal comprises means for estimating vehicle acceleration from said wheel speed signal for all motors, axles or wheels.

10. The regulator of claim 6 wherein said creep rate set point is derived from wheel creep rate polarity.

11. An adhesion control system for a traction vehicle comprising:

means for determining a side of operation of the system relative to a peak of the adhesion-creep curve, the side of operation corresponding to the sign of the slope of the adhesion-creep curve, based on a measurement of torque rate and creep rate, wherein the difference between the torque and inertia multiplied by the creep rate provides a measure of tractive effort, and wherein the sign of the rate of change of tractive effort and the sign of the creep rate are used in conjunction to determine the sign of the slope of the adhesion-creep curve;

means for estimating an actual creep rate comprising a measurement or an estimation of motor or wheel acceleration and locomotive acceleration;

means for selecting a creep rate set point based on the estimate of the sign of the slope of the adhesion-creep curve; and means responsive to said creep rate set point for adjusting the operation of the traction vehicle so that the maximum adhesion value is realized wherein the actual creep rate is increased if the creep rate set point is set to the positive value and is decreased if the creep rate set point is set to the negative value.

12. The adhesion control system of claim 11 wherein the means responsive to said creep rate set point for adjusting the operation of the traction vehicle so that the maximum adhesion value may be realized further comprises a integrator responsive to the creep rate set point and transmits a control signal to the traction vehicle in the form of a torque command or a slip frequency command.

13. The adhesion control system of claim 11 wherein the means responsive to said creep rate set point for adjusting the operation of the traction vehicle so that the maximum adhesion value may be realized further comprises a creep rate error module 46 coupled to the integrator to provide creep rate error signals thereto.

14. An adhesion control system for a traction vehicle 10, the adhesion control system comprising:

a creep rate signal module coupled to receive respective signals representative of vehicle acceleration and vehicle wheel acceleration and to generate a creep rate signal in response to the respective acceleration signals;

a creep rate set point module coupled to said creep rate signal summing junction and configured to generate a creep rate set point signal in response to said creep rate signal;

a creep rate error module coupled to said creep rate signal module and said creep rate set point module and configured to generate a creep rate error signal responsive to said respective creep rate signal and said creep rate set point signal; and an integrator module coupled to said creep rate error module and configured to generate an adhesion torque command in response to said creep rate error signal, said integrator module further being coupled to said a vehicle torque regulator to supply said adhesion torque command thereto.

15. The adhesion control system of claim 14 wherein said creep rate signal module 44 comprises a summing junction.

16. The adhesion control system of claim 15 wherein said creep rate signal module is coupled to a vehicle accelerometer.

17. The adhesion control system of claim 15 wherein said creep rate signal module is coupled to a vehicle acceleration estimator.

18. The adhesion control system of claim 15 wherein said creep rate signal module is coupled to a vehicle wheel speed sensor.

19. The adhesion control system of claim 14 wherein said creep rate set point module is configured to generate said creep rate set point in correspondence with a hysteresis loop relationship.

* * * * *

UNITED STATES PATENT AND TRADEMARK OFFICE
CERTIFICATE OF CORRECTION

PATENT NO. : 6,208,097 B1
DATED : March 27, 2001
INVENTOR(S) : Reddy et al.

It is certified that error appears in the above-identified patent and that said Letters Patent is hereby corrected as shown below:

The second inventor correct spelling is Jeffrey Louis Daigle.

Signed and Sealed this

Thirtieth Day of October, 2001

*Attest:*

*Attesting Officer*

NICHOLAS P. GODICI
*Acting Director of the United States Patent and Trademark Office*